United States Patent
Vose

[15] 3,641,748
[45] Feb. 15, 1972

[54] COUNTERBALANCE AND LIFT SYSTEM FOR MOWING UNITS

[72] Inventor: Robert W. Vose, 1528 Piper Road, W. Springfield, Mass. 01089

[22] Filed: Mar. 12, 1970

[21] Appl. No.: 18,894

[52] U.S. Cl. ............................................56/15.7, 56/16.2
[51] Int. Cl. ......................................................A01d 35/24
[58] Field of Search.......................56/6, 7, 10.9, 12.3, 12.6, 56/15.7, 15.8, 249, 304, 306, 15.9–16.3

*Primary Examiner*—Russell R. Kinsey
*Assistant Examiner*—J. A. Oliff

*Attorney*—Kenwood Ross and Chester E. Flavin

[57] ABSTRACT

Means are provided constituting a single unified system for accomplishing the several functions of counterbalancing, adjusting, equalizing, damping, lifting, and stowing the individual units of a mowing machine or lawnmower. An air charge in an accumulator functions as the resilient counterbalancing element; adjustability is obtained by the alteration of the air pressure; equalization results from hydraulic distribution to lifting cylinders at each of the mowing units; and oscillation is suppressed by damping restrictions in the hydraulic lines. Additionally, a pump and valve combination in the hydraulic line converts the system to lift the moving units for transport and to elevate and stow same.

3 Claims, 2 Drawing Figures

PATENTED FEB 15 1972 3,641,748

INVENTOR.
ROBERT W. VOSE
BY Kenwood Ross &
Chester E. Flavin
ATTORNEYS.

COUNTERBALANCE AND LIFT SYSTEM FOR MOWING UNITS

CROSS-REFERENCE TO RELATED APPLICATION

This application is a continuation-in-part of an application filed simultaneously herewith, entitled "Oscillation Suppressor for Mowing Machines," Ser. No. 18,955, filed Mar. 12, 1970, in which is disclosed an air-hydraulic counterbalancing system for mowing units, same being a part of the invention described and claimed herein.

BACKGROUND OF THE INVENTION

1. Field of the Invention

In the mowing of grass other than for purely agricultural purposes, evenness of cut and resulting appearance are of importance, and a wide variety of special machines have been developed for achieving these desiderata.

2. Description of the Prior Art

In all but the smallest mowing machines or lawnmowers, it is usual to provide a plurality of individual mowing units and to guide these units from a tractive unit by linkages allowing them limited freedom to follow the contour of the turf. It is also customary to counterbalance a portion of the weight of these units by suspension from the tractive unit in order to reduce frictional drag on the machine and to minimize turf damage. Such counterbalancing has been accomplished in the past by use of spring mechanisms, and in most cases each mowing unit has been provided with an individual spring and an adjusting means. The springs used have necessarily been heavy and bulky to provide a reasonable constancy of counterbalancing action over the considerably travel allowed for following turf irregularities.

Additional mechanisms are used in larger machines to lift the mowing units to a transport position, suitable for traversing driveways and roads and for negotiating obstacles such as curbings. Still more mechanisms are provided in most machines to elevate and stow the outboard mowing units which project beyond the tractive unit, enabling the machine to be used on confined grounds and to be conveniently stored. These various mechanisms range from simple hooks and chains to power-driven hydraulic systems, according to the size and type of machine.

The multiplicity of mechanisms which have been enumerated results in undesirable complexity and cost. Difficulties in maintenance and repair are encountered, and operation may be awkward. In particular, the adjustment of counterbalancing springs is often enigmatic to an ordinary operator.

SUMMARY OF THE INVENTION

The resilience of an air charge in an accumulator is utilized, through hydraulic transmitting means, to counterbalance all the mowing units of a mowing machine. A pump and a valve convert the hydraulic portion of the system to lift the mowing units to a transport position and to a stowed position. Equalization of counterbalancing among the mowing units is assured, and simplification and convenience are obtained as compared with the use of separate mechanisms for each of the several purposes and mowing units.

DESCRIPTION OF THE PREFERRED EMBODIMENT

Figure 1:
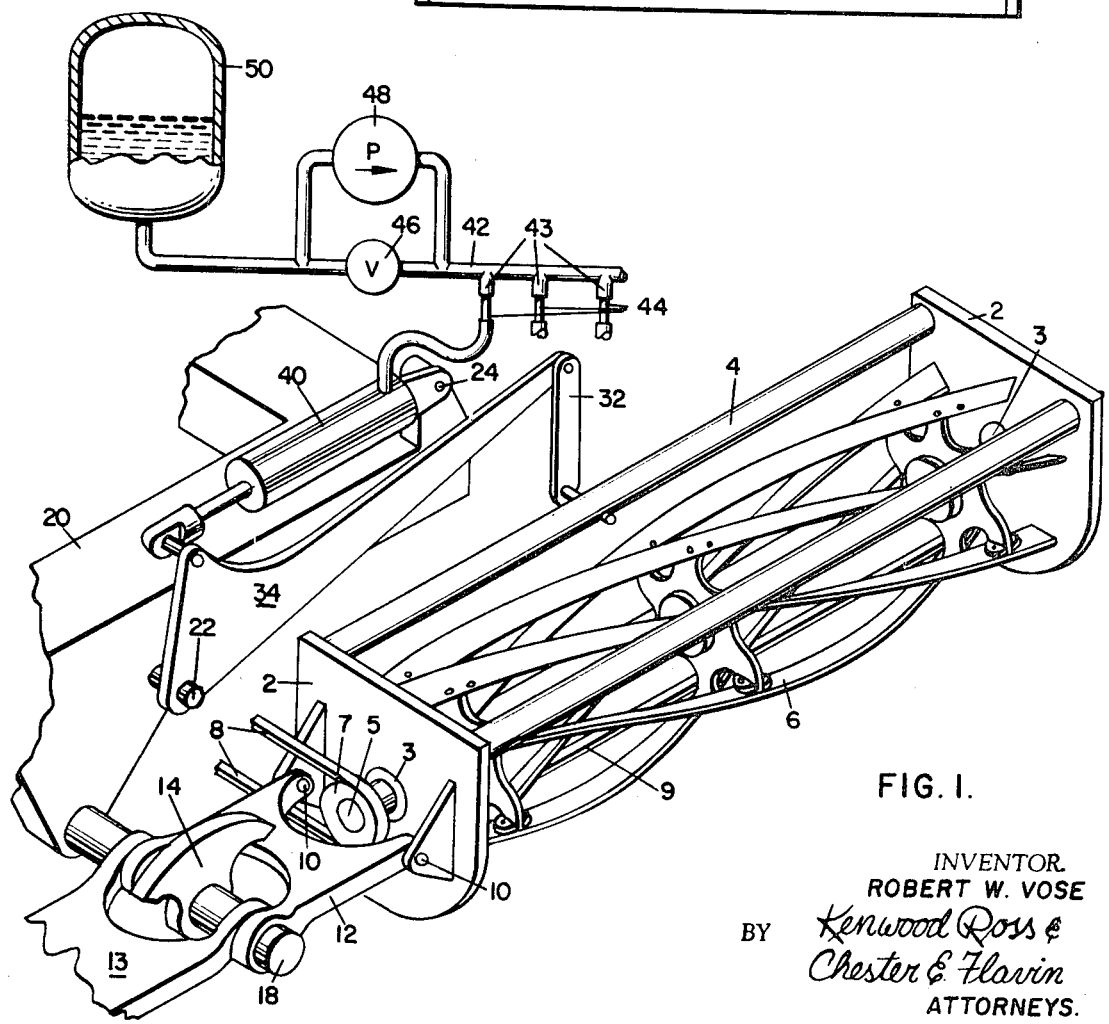
FIG. 1 is a perspective view, from the front, of a left-side outboard mowing unit, together with a portion of the frame of the tractive unit from which it is guided and counterbalanced. Also shown is the attaching link for a right side outboard unit, the latter being a mirror image of the left-side unit and not shown. The complete machine includes a third or central mowing unit, also not shown, disposed rearwardly of the two outboard units and arranged to traverse the gap between them.

Referring first to FIG. 1, there is shown a mowing unit consisting of a frame 2 carrying by means of bearings 3, a shaft 5 and a bladed reel 6. Reel 6 is driven through shaft 5 by a pulley 7 and belt 8 from a suitable pulley on the tractive unit, not shown, and its blades shear against a bed knife 9 mounted in frame 2. Frame 2 is pivoted by pins 10 to a link 12 which is in turn pivoted about an extension 18 of a fame 20 of the mowing unit. By this means, the mowing unit is constrained to move generally with the tractive unit, but is allowed freedom to follow the contour of the turf over which it rides on a skid mounted below bed knife 9 and not visible in the drawing. A second link 13 pivots about extension 18 and carries a second mowing unit, not shown, oppositely disposed to the first unit.

A portion of the weight of the mowing unit is counterbalanced through a link 32 pivoted to crossmember 4 of frame 2 and to a bellcrank 34. Bellcrank 34 is pivoted at 22 to frame 20 of the tractive unit, and receives the thrust of a single-acting hydraulic cylinder 40 which is anchored at 24 to frame 20. The head end of cylinder 40 is connected by a suitable hose and piping 42 through a valve and positive displacement pump arrangement 46 and 48 respectively to an accumulator 50. Accumulator 50 is partially filled with oil or other suitable liquid, and its remaining volume is charged with air under pressure. In accord with standard practice, the accumulator is provided with connections for introducing the air charge from an external source and for exhausting the charge, if desired, and with a pressure gauge and a relief valve, none of which features are shown. Piping 42 is provided with branches 43 and with restrictions 44, whose respective functions will be explained subsequently.

With valve 46 open and pump 48 inactive, the pressure of the air charge in accumulator 50 is transmitted hydraulically to cylinder 40, causing a thrust on bellcrank 34 and a tension in line 32. By manual alteration of the pressure of the air charge in the accumulator, the tension in link 32 may be adjusted to counterbalance any desired portion of the weight of the mowing unit, 60 to 85 percent being the workable range. As the mowing unit rises and falls in following the turf contour, the mechanical linkage, cylinder 40, and the hydraulic liquid move correspondingly. In accumulator 50, this motion is absorbed by the resilience of the air charge, and with a sufficient volume of air there may be obtained a reasonably constant counterbalancing effect throughout the normal vertical travel of the mowing unit.

Figure 2:
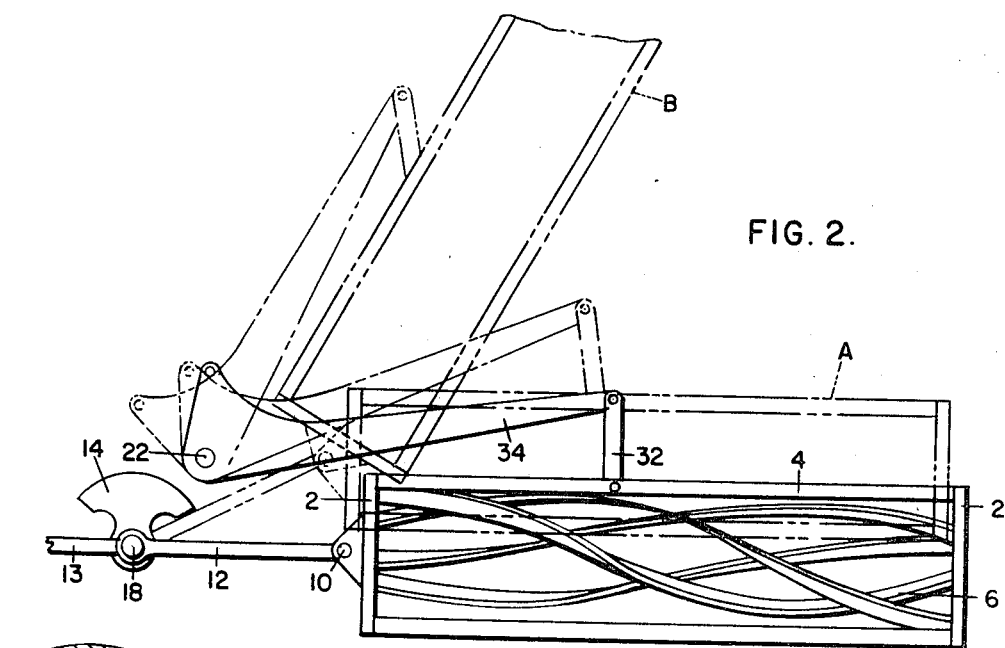
FIG. 2 is a front elevational view of the outboard unit in its mowing position, with indications in phantom of the positions taken by the unit when lifted for transport and when stowed.

By closing valve 46 and actuating positive displacement pump 48, liquid is forced from accumulator 50 to cylinder 40, raising the mowing unit clear of the turf, as shown by position "A" in FIG. 2. This is designated as the transport position, and is used in traversing driveways and roads and in negotiating obstacles such as curbings.

With valve 46 still closed, pump 48 may be further actuated. Stop 14 fastened to extension 18 of frame 20 prevents further angular travel of link 12, and consequently the mowing unit is elevated about pins 10 until it reaches the stowed position "B" of FIG. 2. In this configuration, the overall expanse of the mowing machine is reduced for convenience in storage.

From either the transport or stowed positions, the mowing unit may be lowered to the working position by opening valve 46, and the counterbalancing action of the system will be resumed automatically. Restriction 44 in piping 42 prevents sudden descent of the unit which might endanger personnel and equipment, and also furnishes damping to suppress oscillation as disclosed in my above mentioned copending application.

Piping branches 43 are provided in sufficient number for connection to similar counterbalancing arrangements on each of the mowing units included in the mowing machine, thereby providing for the hydraulically equalized counterbalancing of all such units. Operation of valve 46 and pump 48 will simultaneously lift or lower all units as desired. A unit which does not project outboard of the main tractive unit need not be elevated beyond the transport position ("A" of FIG. 2) and accordingly may be restrained in that position by suitable stops while pump 48 continues to elevate and stow the outboard units.

In large machines, particularly those having five or more mowing units, it may be desirable to be able to stow an outboard pair of units while leaving the inboard unit or units in counterbalanced position for mowing, thus adapting the machine to temporary use on restricted grounds. This may be accomplished by segregating the counterbalance cylinders of the outboard pair of units from the main piping system and serving them instead through a separate valve-and-pump combination from the main accumulator 50.

In small mowing machines, pump 48 may advantageously be operated manually, giving the operator direct control of the action. In larger machines, pump 48 may be power-operated, in which case it is necessary to provide certain pressure relief valves and automatic shutoff devices to prevent damage from overtravel, in accord with standard practice.

I claim:

1. In a mowing machine having a tractive unit and a mowing unit, means for counterbalancing the mowing unit connected between the mowing unit and tractive unit and including an accumulator having a resilient charge of compressed gas as its active element.

2. The means as set forth in claim 1, and including a hydraulic transmitting means acting between the accumulator and the mowing unit.

3. The means as set forth in claim 2, and including in the hydraulic transmitting means a valve and a pump arranged to convert the hydraulic means to furnish positive lifting of the mowing unit.

* * * * *